US012640674B2

(12) United States Patent
R C et al.

(10) Patent No.: US 12,640,674 B2
(45) Date of Patent: May 26, 2026

(54) FEEDBACK CURRENT CONTROL OF INDUCTION MACHINES

(71) Applicant: Steering Solutions IP Holding Corporation, Saginaw, MI (US)

(72) Inventors: Vignesh Kumar R C, Saginaw, MI (US); Moinul Haque, Saginaw, MI (US); Krishna MPK Namburi, Saginaw, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 315 days.

(21) Appl. No.: 18/469,765

(22) Filed: Sep. 19, 2023

(65) Prior Publication Data

US 2025/0096714 A1     Mar. 20, 2025

(51) Int. Cl.
| | |
|---|---|
| *H02P 27/04* | (2016.01) |
| *B60L 15/02* | (2006.01) |
| *H02P 21/18* | (2016.01) |
| *H02P 21/22* | (2016.01) |
| *H02P 23/14* | (2006.01) |
| *H02P 27/06* | (2006.01) |

(52) U.S. Cl.
CPC ............ *H02P 23/14* (2013.01); *B60L 15/025* (2013.01); *H02P 21/18* (2016.02); *H02P 21/22* (2016.02); *H02P 27/06* (2013.01)

(58) Field of Classification Search
CPC .......... H02P 23/14; H02P 21/18; H02P 27/06; H02P 27/047
See application file for complete search history.

(56) References Cited

U.S. PATENT DOCUMENTS

| | | | |
|---|---|---|---|
| 10,277,143 B1 * | 4/2019 | Lee | ......................... H02P 27/047 |
| 2014/0210391 A1 * | 7/2014 | Bozic | ...................... H02P 6/181 |
| | | | 318/400.11 |

FOREIGN PATENT DOCUMENTS

JP     H03107386 A     5/1991

OTHER PUBLICATIONS

Office Action regarding corresponding DE App. No. 10 2024 126 632.5; issued Jul. 4, 2025.

* cited by examiner

*Primary Examiner* — Cortez M Cook
(74) *Attorney, Agent, or Firm* — Dickinson Wright PLLC

(57) ABSTRACT

A method for controlling an induction machine includes: determining a forward path voltage signal based on a command current and using a first set of gain factors; determining an estimated slip speed; determining a feedback path voltage signal based on a measured motor current and using a second set of gain factors, at least one gain factor of the second set including the estimated slip speed; determining a reference voltage signal based on both the forward path voltage signal and the feedback path voltage signal; and commanding, based on the reference voltage signal, an inverter to apply an output voltage to the induction machine and thereby causing an output current to be generated. At least one of the first set and the second set of gain factors is configured to cause a d-axis component to be decoupled from variations of a q-axis component of the output current, and vice-versa.

20 Claims, 10 Drawing Sheets

MOST
MEDIA ORIENTED SYSTEMS TRANSPORT
ETHERNET AVB (AUDIO VIDEO BRIDGING)
ETHERNET TSN (TIME-SENSITIVE NETWORKING)

28

LIN
LOCAL INTERCONNECT NETWORK
MULTIFUNCTION KEYLESS SYSTEM

32

CAN
CONTROLLER AREA NETWORK
COLLISION DETECTION
SYSTEM

26

18

12

14

22

20

FlexRay
BRAKE-BY-WIRE SYSTEM

30

ETHERNET

24

10

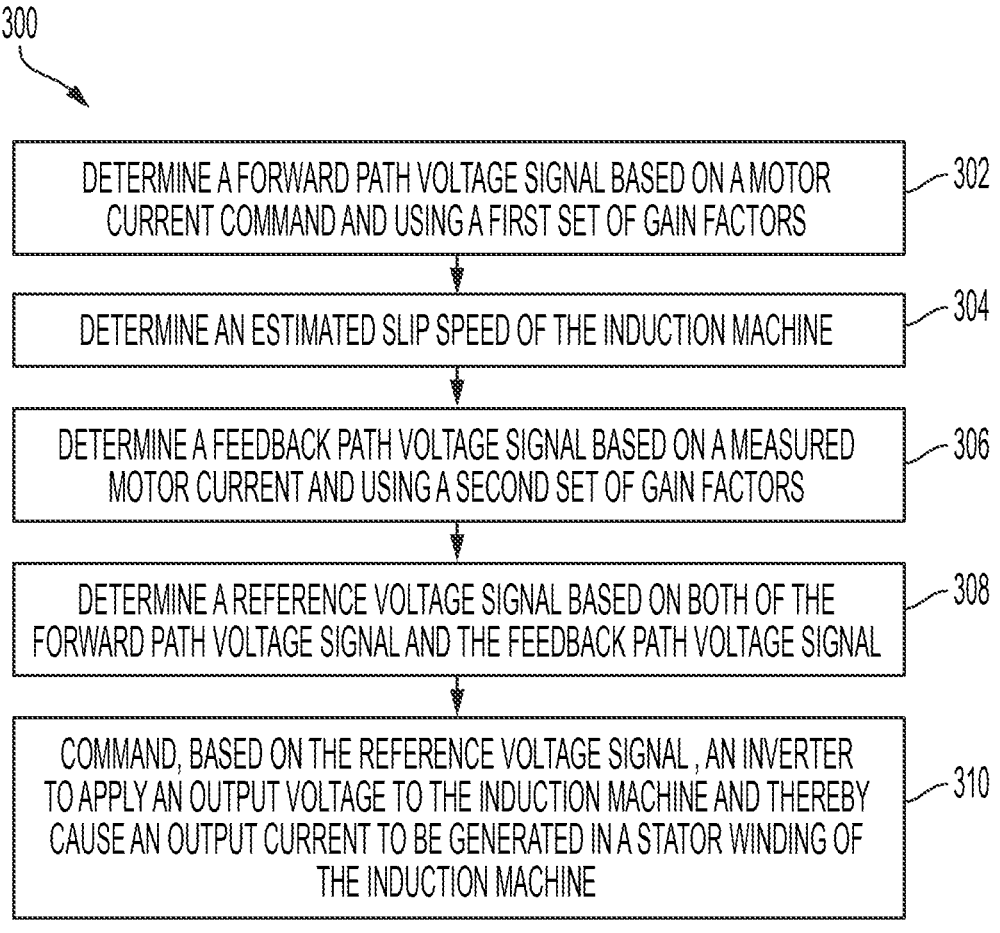

300

DETERMINE A FORWARD PATH VOLTAGE SIGNAL BASED ON A MOTOR CURRENT COMMAND AND USING A FIRST SET OF GAIN FACTORS — 302

DETERMINE AN ESTIMATED SLIP SPEED OF THE INDUCTION MACHINE — 304

DETERMINE A FEEDBACK PATH VOLTAGE SIGNAL BASED ON A MEASURED MOTOR CURRENT AND USING A SECOND SET OF GAIN FACTORS — 306

DETERMINE A REFERENCE VOLTAGE SIGNAL BASED ON BOTH OF THE FORWARD PATH VOLTAGE SIGNAL AND THE FEEDBACK PATH VOLTAGE SIGNAL — 308

COMMAND, BASED ON THE REFERENCE VOLTAGE SIGNAL , AN INVERTER TO APPLY AN OUTPUT VOLTAGE TO THE INDUCTION MACHINE AND THEREBY CAUSE AN OUTPUT CURRENT TO BE GENERATED IN A STATOR WINDING OF THE INDUCTION MACHINE — 310

FIG. 12

FEEDBACK CURRENT CONTROL OF INDUCTION MACHINES

TECHNICAL FIELD

This disclosure relates to electric motor drives and in particular to feedback current-control operation of a motor drive system for an induction machine.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system and/or other features of the vehicle may include one or more electric motors. Such electric motors may comprise induction machines, which may also be called induction motors.

Although low-weight and high power-density are desirable characteristics for selecting a motor, the increasing cost of rare-earth materials has caused renewed interest in rare-earth free motors such as induction machines (IM) for traction applications. Moreover, its power density has been improved by optimizing the design of IM. Also, the induction motor offers robust structure, higher maximum speed, and low current at no load and part load operation. Control of IM has always proven to be a challenging problem due to the non-linear relationship of electromagnetic torque with rotor-flux and stator current. Field-oriented control (FOC) is a popular and well-established control method for IM. In FOC, the time-variant control quantities in the abc reference frame are transformed to time-invariant quantities in the d-q reference frame. The d-q controls for IM are broadly classified as feedforward current control and feedback current control. A feedforward controller utilizes the knowledge of the motor model to generate a control voltage command for the motor, where the feedback current control uses the measured current to minimize the error between the commanded and the measured currents. The present disclosure provides a feedback current control method is for induction motors.

In traction applications, IM feedback current control system should operate with fast torque response and satisfactory steady state performance over the whole speed range. Also, it should show robustness to the modeling uncertainties and have disturbance and noise rejection characteristics. The present disclosure provides a combined feedback controller and a forward path controller for the current controller of IM. The first step for decoupling current control of IM is to eliminate the cross-coupling terms. The effect of the cross-coupling terms increases with increasing speed. Existing IM control techniques may be insufficiently robust to the parameter changes and the speed range. An important step in IM current control is to linearize the d-q model. For this step, accurate estimation of slip speed and rotor flux are important for the estimation of the voltage terms and decoupling of the model.

SUMMARY OF THE INVENTION

This disclosure relates generally to control of induction machines, such as induction motors.

An aspect of the disclosed embodiments includes a method for controlling an induction machine. The method includes: determining a forward path voltage signal based on a command current and using a first set of gain factors; determining an estimated slip speed of the induction machine; determining a feedback path voltage signal based on a measured motor current and using a second set of gain factors, wherein at least one gain factor of the second set of gain factors includes the estimated slip speed of the induction machine; determining a reference voltage signal based on both of the forward path voltage signal and the feedback path voltage signal; and commanding, based on the reference voltage signal, an inverter to apply an output voltage to the induction machine and thereby causing an output current to be generated in a stator winding of the induction machine.

Another aspect of the disclosed embodiments includes a system for controlling an induction machine. The system includes: a processor and a memory including instructions. The instructions, when executed by the processor, cause the processor to: determine a forward path voltage signal based on a command current and using a first set of gain factors; determine an estimated slip speed of the induction machine; determine a feedback path voltage signal based on a measured motor current and using a second set of gain factors, wherein at least one gain factor of the second set of gain factors includes the estimated slip speed of the induction machine; determine a reference voltage signal based on both of the forward path voltage signal and the feedback path voltage signal; and command, based on the reference voltage signal, an inverter to apply an output voltage to the induction machine and thereby causing an output current to be generated in a stator winding of the induction machine.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 12 is a flow diagram generally illustrating a method for controlling an induction machine, according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure provides a state feedback controller that is configured for decoupling and plant modification. This state feedback controller is also called feedback path controller. A forward-path controller is designed based on the effective plant model to achieve a desired performance. Decoupling refers to current control in which an output current has a d-axis component and a q-axis component, with each of those components being operable independent of variations in the other component.

The present disclosure provides, three current control methods for induction machines (IM) including Direct decoupling control (DDC), enhanced feedback decoupling control (EFDC), and active damping decoupling control (ADDC). Similar current control methods have been implemented for the control of PMSM (Permanent Magnet Synchronous Motors) and other synchronous motors. However, plant modification decoupling methods have not been implemented for asynchronous motors such as IM.

In PMSM applications, rotor speed and stator flux are moving at a same speed, but in IM, there is a slip between the rotor speed and the stator electrical speed. Estimation of the slip speed is important for implementing field-oriented control (FOC) of IM. Moreover, the back EMF term of the PMSM is a function of back emf (Back EMF) constant ($K_e$) and rotor speed. $K_e$ is an inherent property of the magnetic material of PMSM, and the rotor speed is a measurable quantity. On the other hand, the Back EMF terms in induction motor is a function of d-axis rotor flux and slip speed. For optimal control of an induction motor, these quantities need to be accurately estimated. In the present disclosure, these terms are estimated in two ways—d-axis and q-axis current commands, and measured d-axis and q-axis currents for decoupling and linearizing the motor model. Moreover, the dynamics of the rotor flux are also considered for torque estimation and model linearization.

Figure 1:
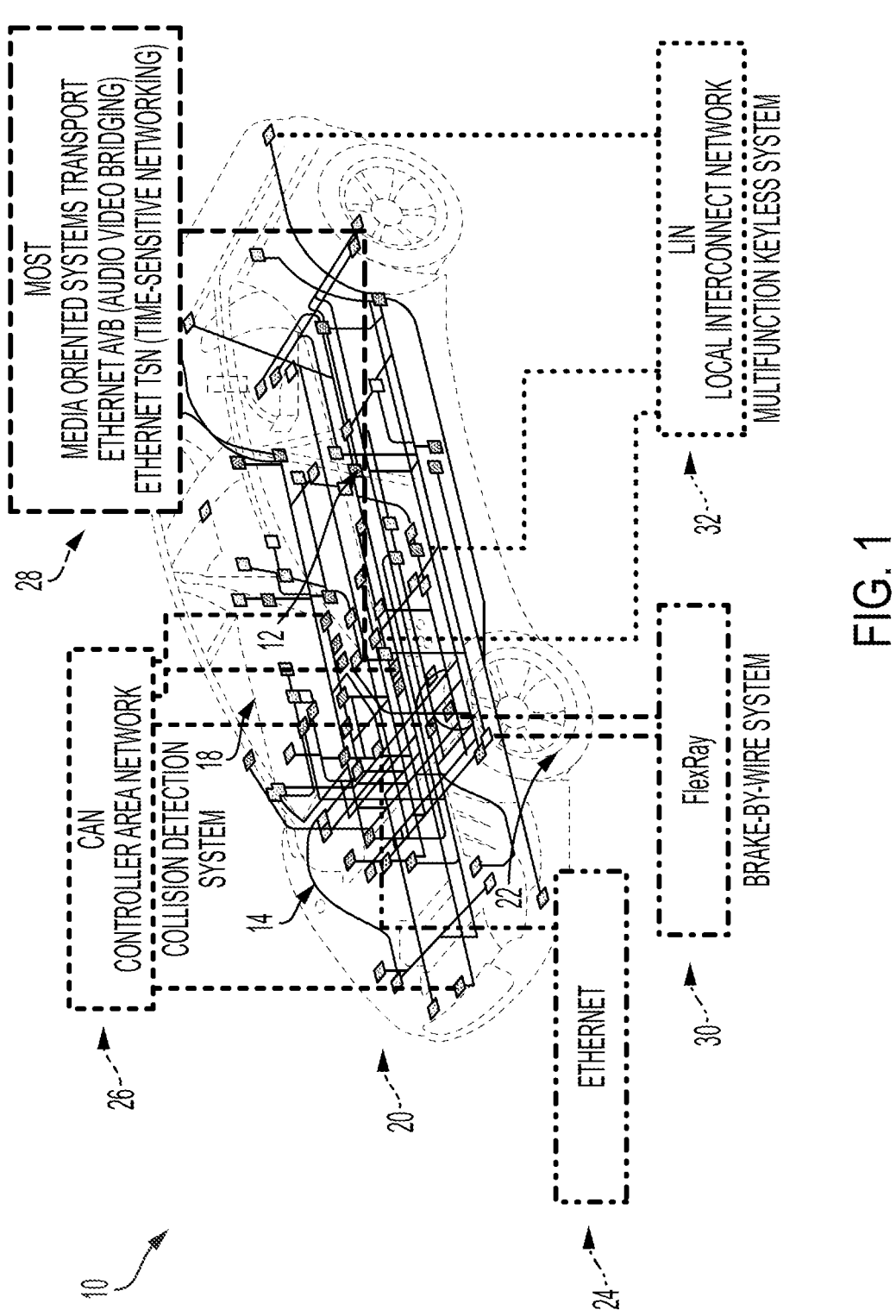
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. In some embodiments, the vehicle 10 may include a controller, such as controller 150, as is generally illustrated in FIG. 2.

Figure 2:
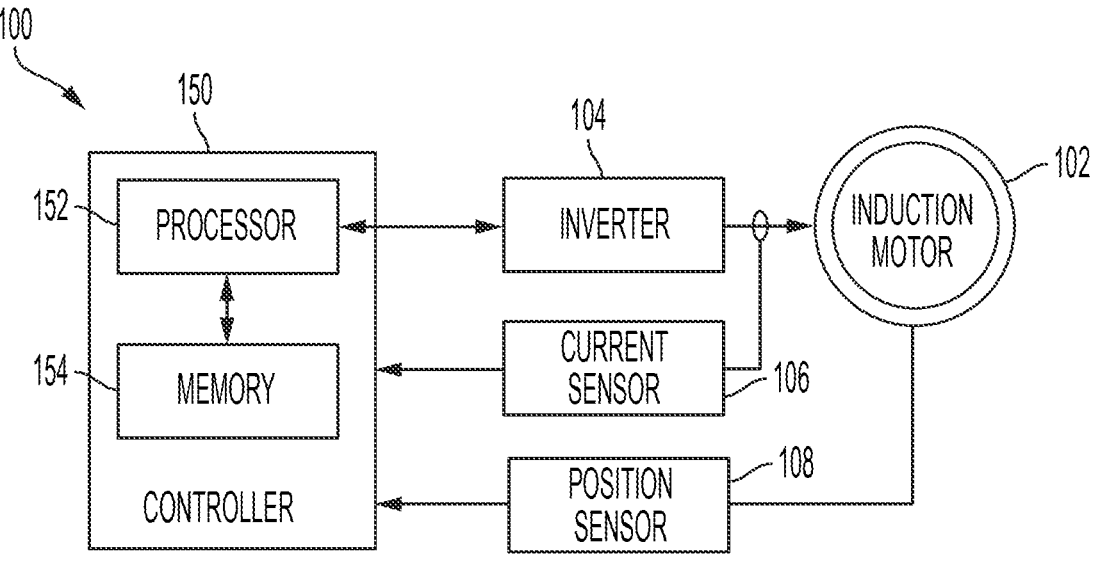
FIG. 2 shows a block diagram showing hardware components of a motor control system, according to aspects of the present disclosure.

FIG. 2 shows a block diagram showing a motor control system 100 that includes an IM 102 that is connected to an inverter 104. The inverter 104 is configured to generate and apply an alternating current (AC) power to the IM 102. The motor control system 100 also includes a current sensor 106 that measures one or more phase currents in corresponding motor leads between the inverter 104 and the IM 102. The motor control system 100 also includes a position sensor 108 that measures a rotational position of the IM 102.

The motor control system 100 also includes a controller 150. The controller 150 may include any suitable controller, such as an electronic control unit or other suitable controller. The controller 150 may be configured to control, for example, the various functions of the steering system and/or various functions of the vehicle 10. The controller 150 may include a processor 152 and a memory 154. The processor 152 may include any suitable processor, such as those described herein. Additionally, or alternatively, the controller 150 may include any suitable number of processors, in addition to or other than the processor 152. The memory 154 may comprise a single disk or a plurality of disks (e.g., hard drives), and includes a storage management module that manages one or more partitions within the memory 154. In some embodiments, memory 154 may include flash memory, semiconductor (solid state) memory or the like.

The memory 154 may include Random Access Memory (RAM), a Read-Only Memory (ROM), or a combination thereof. The memory 154 may include instructions that, when executed by the processor 152, cause the processor 152 to, at least, control various aspects of the vehicle 10. Additionally, or alternatively, the memory 154 may include instructions that, when executed by the processor 152, cause the processor 152 to perform functions associated with the systems and methods described herein.

As shown, the controller 150 is operably connected to the inverter 104 and configured to send one or more commands to cause the inverter 104 to apply the AC power to the IM 102. The controller 150 may receive one or more signals from the current sensor 106, the position sensor 108, the inverter 104 and/or one or more other sensors. The sensors may include any suitable sensors, measurement devices, and/or other suitable mechanisms. For example, the sensors may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, controller 150 may be configured to provide rack force effort-based damping for the steering system of the vehicle 10. As described, the steering system may include a SbW steering system. The controller 150 may receive a torque signal associated with a torque applied to the handwheel of the vehicle 10. The controller 150 may determine a vehicle speed of the vehicle 10. The controller 150 may identify, in a rack force look-up table, a rack force value based on the torque signal and the vehicle speed. The rack force look-up table may include a two-dimensional look-up table (e.g., or other suitable table) that includes a plurality of rack force values that correspond to respective torque and varies with vehicle speed.

In some embodiments, the controller 150 may perform the methods described herein. However, the methods described herein as performed by the controller 150 are not meant to be limiting, and any type of software executed on a controller or processor can perform the methods described herein without departing from the scope of this disclosure. For example, a controller, such as a processor executing software within a computing device, can perform the methods described herein.

Figure 3:
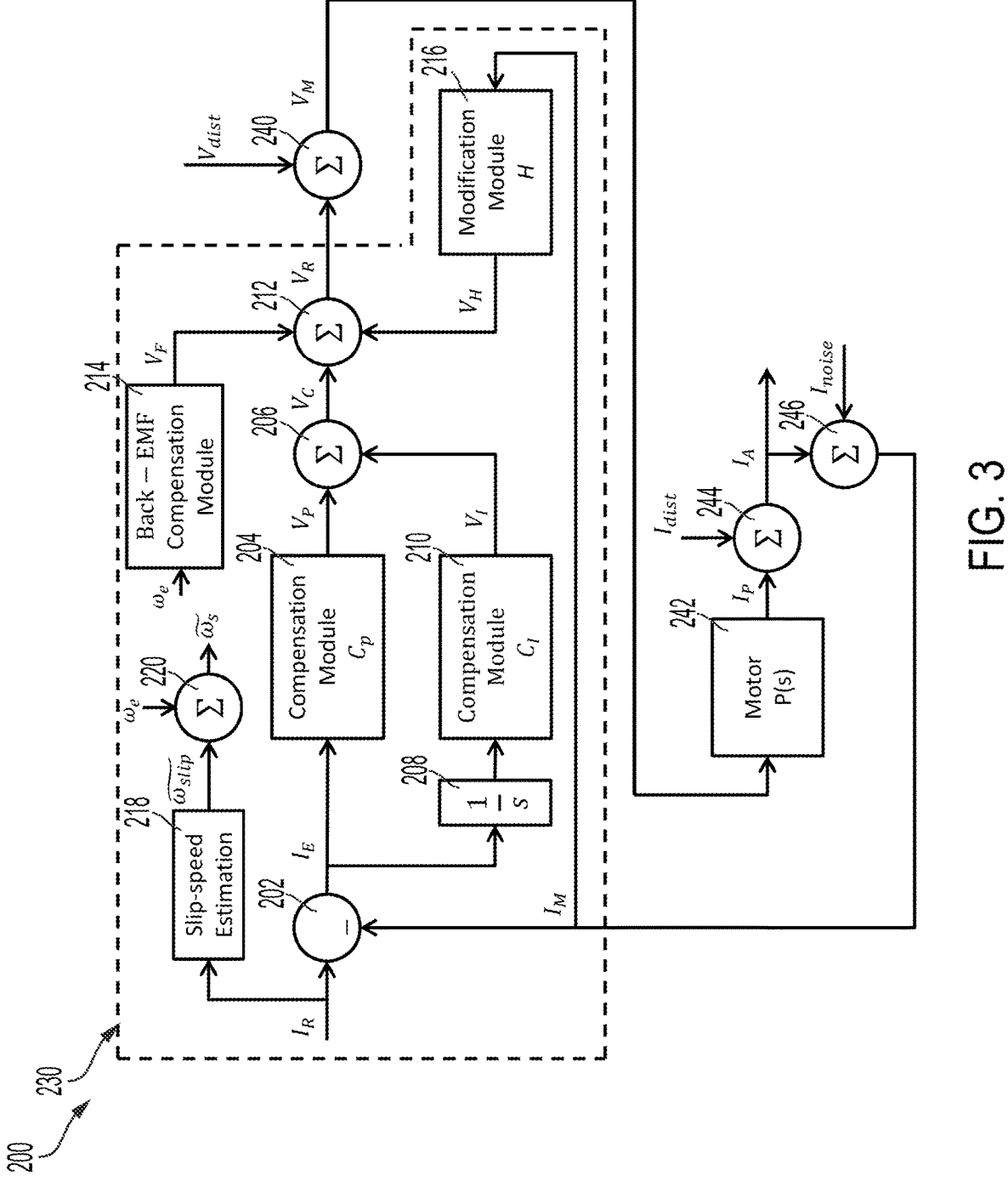
FIG. 3 shows a block diagram representation of a feedback current control system, according to aspects of the present disclosure.

FIG. 3 shows a block diagram of a feedback current control system 200. The feedback current control system 200 may be used to model and/or control an inverter supplying alternating current power to an induction machine. The feedback current control system 200 takes a reference current $I_R$, which may also be called a command current i*, and determines an appropriate voltage command signal $V_R$ that is sent to the inverter 104, which in turn applies phase voltages to the IM 102. The feedback current control system 200 also models a measured voltage $V_M$ applied to the IM 102, and a measured current $I_M$, which may be measured by the current sensor 106.

The feedback current control system 200 includes a subtractor 202 that subtracts the measured current $I_M$ from the reference current $I_R$ to calculate an error current $I_E$, which may also be called a difference current. The feedback current control system 200 also includes a proportional compensation module 204 which applies a proportional gain function $C_P$, to compute a proportional voltage $V_P$ based on the error current $I_E$.

The feedback current control system 200 also includes a first adder 206 that is configured to compute a command voltage $V_C$ as a sum of the proportional voltage $V_P$ and an integral voltage $V_I$. The feedback current control system 200 also includes an integrator 208 that computes an integral signal representing an integral of the error current $I_E$. The feedback current control system 200 also includes an integral compensation module 210 which applies an integral gain function $C_I$ to compute the integral voltage V/based on the integral of the error current $I_E$.

The feedback current control system 200 also includes a second adder 212 that is configured to compute a reference voltage $V_R$ as a sum of the command voltage $V_C$, a BEMF compensation voltage $V_F$, and a modification voltage $V_H$. The feedback current control system 200 also includes a back-EMF (BEMF) compensation module 214 that is configured to calculate the BEMF compensation voltage $V_F$ based on a rotor electrical speed $\omega_e$ of the IM 102. The feedback current control system 200 also includes a modification module 216, also labeled H, and which is configured to calculate the modification voltage $V_H$, which may also be called a feedback path voltage signal, based on a measured current $I_M$ representing a measurement of current in the windings of the IM 102.

The feedback current control system 200 also includes a slip-speed estimator 218 that is configured to compute an estimated slip speed $\widetilde{\omega_{slip}}$, which may also be represented as $\widetilde{\omega_{slip}}$, and based on the reference current $I_R$. The feedback current control system 200 also includes a third adder 220 that is configured to compute an estimated stator electrical frequency $\widetilde{\omega_s}$, which may also be represented as $\widetilde{\omega_s}$, as a sum of the estimated slip speed $\widetilde{\omega_{slip}}$ sup and the rotor electrical speed de.

The feedback current control system 200 includes a feedback current controller 230 that includes components 202-220, and which may be implemented in a controller, such as controller 150. The feedback current control system 200 also includes additional components 240-246 that may represent characteristics of physical devices, such as the inverter 104, the IM, 102, and the current sensor 106.

The feedback current control system 200 also includes a fourth adder 240 that is configured to compute a motor voltage $V_M$ as a sum of the reference voltage $V_R$ and a disturbance voltage $V_{dist}$. The motor voltage $V_M$ may represent an actual voltage applied to the windings of the IM 102. The feedback current control system 200 also includes a motor plant model 242, also labeled P(s), and which is configured to calculate a plant current $I_P$ representing current generated in the windings of the IM 102 resulting from application of the motor voltage $V_M$.

The feedback current control system 200 also includes a fifth adder 244 configured to compute an actual current $I_A$ as a sum of the plant current $I_P$ and a disturbance current $I_{dist}$. The feedback current control system 200 also includes a sixth adder 246 configured to compute the measured current $I_M$ as a sum of actual current $I_A$ and a noise signal $I_{noise}$. The noise signal $I_{noise}$ may be introduced, for example, by the current sensor 106 and as a result of the process of measuring the measured current $I_M$.

Figure 4:
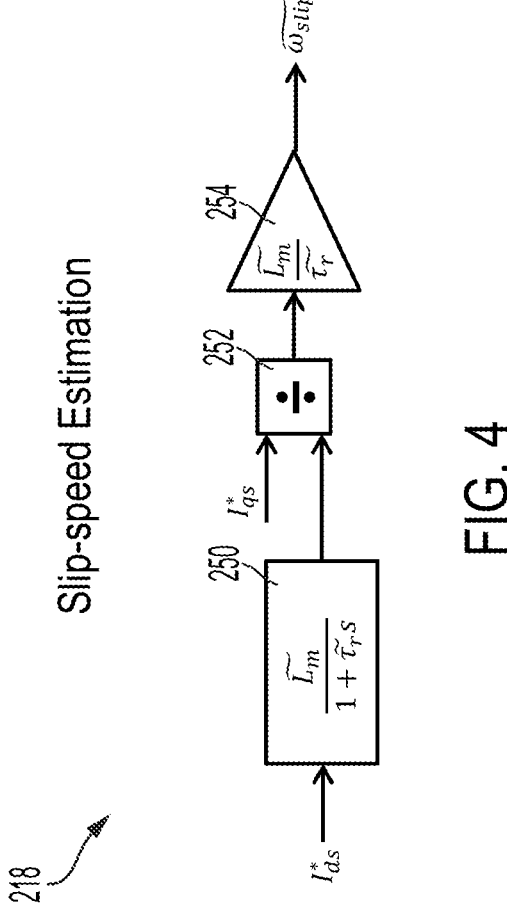
FIG. 4 shows a block diagram representation of a slip-speed estimator, according to aspects of the present disclosure.

FIG. 4 shows a block diagram representation of the slip-speed estimator 218. The slip-speed estimator 218 is configured to compute the estimated slip speed $\widetilde{\omega_{slip}}$, which based on the reference current $I_R$, which may also be called a command current $$I_s^*,$$

and which includes a d-axis component $$I_{ds}^*$$

and a q-axis component $$I_{qs}^*.$$

The d-axis component $$I_{ds}^*$$

of the command current $$I_s^*$$

may also be called a d-axis command current $$I_{ds}^*,$$

and the q-axis component $$I_{qs}^*$$

of the command current $$I_s^*$$

may also be called a q-axis command current $$I_{qs}^*.$$

The slip-speed estimator 218 includes a first computation block 250 that is configured to compute a product of the d-axis command current $$I_{ds}^*$$

and a value of $$\frac{\widetilde{L_m}}{1+\widetilde{\tau_r}s},$$

where $\widetilde{L_m}$ represents an estimated magnetizing inductance of the IM 102, $\widetilde{\tau_r}$ represents an estimated rotor time constant of the IM 102, and s represents the derivative operator, which will be discretized in a microprocessor or microcontroller-based implementation.

The slip-speed estimator 218 also includes a divider 252 configured to compute a quotient signal by dividing the q-axis command current $$I_{qs}^*$$

by the product of the d-axis command current $$I_{ds}^*$$

and $$\frac{\widetilde{L_m}}{1+\widetilde{\tau_r}s},$$

provided from the first computation block 250. The slip-speed estimator 218 also includes a second computation block 254 that is configured to compute the estimated slip speed $\widetilde{\omega_{slip}}$ slip as a product of the quotient signal from the divider 252 and a value of $$\frac{\widetilde{L_m}}{\widetilde{\tau_r}}.$$

Figure 5:
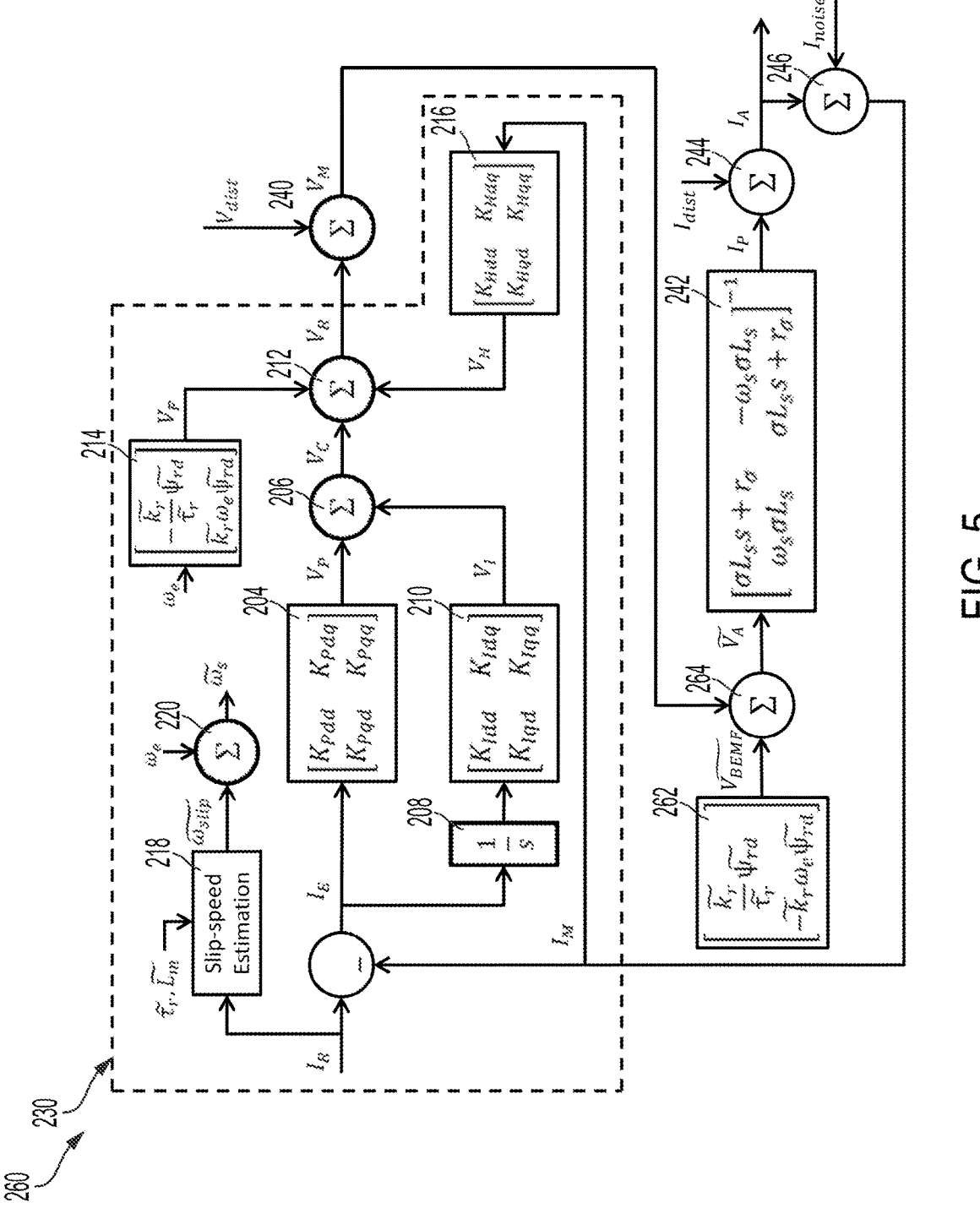
FIG. 5 shows a block diagram representation of a feedback current control system, according to aspects of the present disclosure.

FIG. 5 shows a block diagram representation of a second feedback current control system 260. The second feedback current control system 260 shown in FIG. 5 is similar or identical to the feedback current control system 200 shown in FIG. 3, including a same feedback current controller 230, but showing additional details of each of: the proportional compensation module 204, the integral compensation module 210, the BEMF compensation module 214, the modification module 216, and the motor plant model 242.

As shown in FIG. 5, the proportional compensation module 204 includes a matrix having the form:

$$\begin{bmatrix} K_{Pdd} & K_{Pdq} \\ K_{Pdq} & K_{Pqq} \end{bmatrix}.$$

As also shown in FIG. 5, the integral compensation module 210 includes a matrix having the form:

$$\begin{bmatrix} K_{Idd} & K_{Idq} \\ K_{Idq} & K_{Iqq} \end{bmatrix}.$$

As also shown in FIG. 5, the BEMF compensation module 214 includes a matrix:

$$\begin{bmatrix} \frac{\widetilde{k_r}}{\widetilde{\tau_r}} \widetilde{\psi_r} \\ \omega_e \end{bmatrix}.$$

As also shown in FIG. 5, the modification module 216 includes a matrix having the form:

$$\begin{bmatrix} K_{Hdd} & K_{Hdq} \\ K_{Hdq} & K_{Hqq} \end{bmatrix}.$$

As also shown in FIG. 5, the motor plant model 242 includes a matrix:

$$\begin{bmatrix} \sigma L_s s + r_\sigma & -\omega_s \sigma L_s \\ \omega_s \sigma L_s & \sigma L_s s + r_\sigma \end{bmatrix}^{-1}.$$

As also shown in FIG. 5, the second feedback current control system 260 also includes a BEMF estimator 262 configured to compute an estimated BEMF voltage $\widetilde{V_{BEMF}}$ which is computed in accordance with a matrix:

$$\begin{bmatrix} \frac{\widetilde{k_r}}{\widetilde{\tau_r}} \widetilde{\psi_r} \\ -\widetilde{k_r} \omega_e \widetilde{\psi_{r\sigma}} \end{bmatrix}.$$

The second feedback current control system 260 also includes a seventh adder 264 configured to compute an estimated actual voltage $\widetilde{V_A}$ present on the windings of the IM 102, as a sum of the motor voltage $V_M$ and the estimated BEMF voltage $\widetilde{V_{BEMF}}$. As shown, the actual voltage $V_A$ is provided as an input to the motor plant model 242.

Plant Description

Stator currents in an IM generate a rotating magnetic field which induces a voltage in rotor conductors. This induced voltage causes a rotor current which in turn creates a magnetic field. The interaction between these two magnetic fields generates torque and the subsequent rotor speed. The rotor magnetic field tries to catch up with the stator magnetic field during the motoring action. When these two magnetic fields move at the same speed, there is no torque generated. When the motor exerts torque, the slip speed increases. The stator and rotor voltages, currents, fluxes are time variant quantities in the stationary reference frame, but these terms are time invariant quantities in the synchronous reference frame. The IM is modeled considering the rotor fluxes oriented along the d-axis of the rotating reference frame, as set forth in equations (1)-(5):

$$\frac{di_{sd}}{dt} = -\frac{1}{\tau_\sigma} i_{sd} + \omega_s i_{sq} + \frac{k_r}{r_\sigma \tau_\sigma \tau_r} \psi_{rd} + \frac{1}{r_\sigma \tau_\sigma} v_{sd} \quad (1)$$

$$\frac{di_{sq}}{dt} = -\omega_s i_{sd} - \frac{1}{\tau_\sigma} i_{sq} - \frac{k_r}{r_\sigma \tau_\sigma} \omega_e \psi_{rd} + \frac{1}{r_\sigma \tau_\sigma} v_{sq} \quad (2)$$

$$\frac{d\psi_{rd}}{dt} = \frac{L_m}{\tau_r} i_{sd} - \frac{1}{\tau_r} \psi_{rd} \quad (3)$$

$$0 = \frac{L_m}{\tau_r} i_{sq} - (\omega_s - \omega_e) \psi_{rd} \quad (4)$$

-continued $$T_e = \frac{3}{2}\frac{P}{2}\frac{L_m}{L_r}\psi_{rd}i_{sq} \tag{5}$$

where equation (1) is a stator d-axis current equation, equation (2) is a stator q-axis current equation, equation (3) is a rotor flux d-axis equation, equation (4) is a rotor flux q-axis equation, and equation (5) is a torque equation; and where $i_{sd}$, and $i_{sq}$ are d-axis and q-axis stator currents, respectively; $v_{sd}$, and $v_{sq}$ are d-axis and q-axis stator voltages, respectively; $\psi_{rd}$ is d-axis rotor flux; $\omega_s$ is stator electrical frequency; $\omega_e$ is the rotor electrical speed; $L_m$, $L_s$, and $L_r$ are magnetizing, stator, and rotor inductances, respectively; $r_s$ is stator resistance, $r_r$ is rotor resistance. Additionally, $\tau_r$ is a rotor time constant, which may be determined as set forth in equation (6), $k_r$ is an inductance ratio, which may be determined as set forth in equation (7), $r_\sigma$ is an equivalent stator resistance, which may be determined as set forth in equation (8), $\sigma$ is a constant that represents a magnitude of inductive coupling between the rotor and the stator, which may be determined as set forth in equation (9), and to is an equivalent stator time constant of the induction machine, which may be determined as set forth in equation (10):

$$\tau_r = \frac{L_r}{r_r} \tag{6}$$

$$k_r = \frac{L_m}{L_r} \tag{7}$$

$$r_\sigma = r_s + r_r k_r^2 \tag{8}$$

$$\sigma = 1 - \frac{L_m^2}{L_s L_r} \tag{9}$$

$$\tau_\sigma = \frac{\sigma L_s}{r_\sigma} \tag{10}$$

The motor parameters may vary during the operation of the IM 102. The stator and rotor resistances, $r_s$, and $r_r$, may vary with temperature and motor build. The inductances are the function of saturation. Although the rotor speed can be measured or estimated, slip speed estimation is necessary for the stator flux frequency estimation.

The d-axis rotor flux dynamics are controlled by the d-axis current. However, the dynamics of rotor flux is relatively slow compared to the dynamics of d-axis current due to the influence of magnetizing inductance. Also, the q-axis flux is zero as rotor-flux orientation is along the d-axis. The steady-state electromagnetic torque is dependent on the d-axis rotor flux magnitude and the q-axis current. But, in the steady-state the rotor flux is proportional to the d-axis current. Therefore, the electromagnetic torque is directly proportional to the product of d-axis and q-axis currents.

It can be observed that the d-axis and q-axis stator equations are non-linear. This non-linearity is introduced by the rotor-flux and rotor speed along with the motor parameters.

Linearization

Linearizing the model is the first step for implementing the proposed current controller. The model is linearized as set forth in equations (11)-(12):

$$v'_{sd} = v_{sd} + \frac{k_r}{\tau_r}\psi_{rd} \tag{11}$$

$$v'_{sq} = v_{sq} - k_r\omega_e\psi_{rd} \tag{12}$$

where $$\begin{bmatrix} \dfrac{k_r}{\tau_r}\psi_{rd} \\ -k_r\omega_e\psi_{rd} \end{bmatrix}$$

is the auxiliary voltage term e. The auxiliary voltage term e can be divided into two parts, with the upper part representing a d-axis component of the auxiliary voltage term e, and with the lower part representing a q-axis component of the auxiliary voltage term e.

Based upon this linearization, the motor plant model 242 of the IM 102 may be determined, where $\Delta(s)$ is set forth in equation (13):

$$\Delta(s) = (\sigma L_s)^2 s^2 + 2\sigma L_s r_\sigma s + r_\sigma^2\left(1 + w_s^2 r_\sigma^2\right) \tag{13}$$

For IM, the auxiliary voltage term e contains two estimated parameters, rotor flux $\psi_{rd}$ and slip speed $\omega_{slip}$. Although rotor speed w, can be measured or estimated, the slip speed $\omega_{slip}$ and the rotor flux $\psi_{rd}$ need to be estimated.

In some embodiments, the feedback path transfer function H(s) of the modification module 216 contains only proportional terms. The proportional gain $C_P$ function of the proportional compensation module 204 and the integral gain function $C_I$ of the integral compensation module 210 may be referred together as a forward path transfer function C(s), which has both proportional and integral gains. The gain matrices for these transfer functions H(s), C(s) are defined as set forth in equations (14)-(15):

$$H(s) = \begin{bmatrix} K_{Hdd} & K_{Hdq} \\ K_{Hdq} & K_{Hqq} \end{bmatrix} \tag{14}$$

$$C(s) = \begin{bmatrix} \left(K_{Pdd} + \dfrac{K_{Idd}}{s}\right) & \left(K_{Pdq} + \dfrac{K_{Idq}}{s}\right) \\ \left(K_{Pdq} + \dfrac{K_{Iqd}}{s}\right) & \left(K_{Pqq} + \dfrac{K_{Iqq}}{s}\right) \end{bmatrix} \tag{15}$$

The effective plant seen by the forward path controller 204 due to the decoupling action of the modification module 216 set forth in equation (16):

$$P_{eff} = \left[P^{-1}(s) - H(s)\right]^{-1} \tag{16}$$

Therefore, the effective plant transfer function $P_{eff}(s)$ is set forth in equations (17)-(18):

$$P_{eff}(s) = \frac{1}{\Delta_{eff}(s)}\begin{bmatrix} (\sigma L_s)s + r_\sigma - K_{Hqq} & \omega_s\sigma L_s + K_{Hdq} \\ -\omega_s\sigma L_s + K_{Hqd} & (\sigma L_s)s + r_\sigma - K_{Hdd} \end{bmatrix} \tag{17}$$

$$\Delta_{eff} = ((\sigma L_s)s + r_\sigma - K_{Hqq})((\sigma L_s)s + r_\sigma - K_{Hdd}) + \tag{18}$$

$$(\omega_s\sigma L_s + K_{Hdq})(\omega_s\sigma L_s - K_{Hqd})$$

The cross-diagonal components of the feedback path transfer function H(s), $K_{Hdq}$ and $K_{Hqd}$ eliminate the cross-coupling terms and the diagonal components, $K_{Hqq}$ and $K_{Hdd}$ increase the insensitivity of the motor model to the resistance variation.

The transfer function for measured current $i_{meas}$ to reference current $I_{dist}$, voltage disturbance $v_{dist}$, current disturbance $i_{dist}$, and current measurement noise $I_{noise}$ is set forth in equation (19):

$$i_{meas} = \frac{P_{eff}C}{1 + P_{eff}C}I_{ref} + \frac{P_{eff}}{1 + P_{eff}C}v_{dist} + \frac{P_{eff}P^{-1}}{1 + P_{eff}C}i_{dist} + \frac{P_{eff}(H - C)}{1 + P_{eff}C}i_{noise} \quad (19)$$

Direct Decoupling Control (DDC)

In DDC, the cross-coupling terms are eliminated, but the natural properties of the plant are not affected. Thus, a DDC control system would be sensitive to the resistance variation due to temperature and other causes. The gains of the feedback controller are set forth in equations (20)-(21):

$$K_{Hdd} = K_{Hqq} = 0 \quad (20)$$

$$K_{Hdq} = \widehat{\sigma L_s}(\widehat{\omega_r} + \widehat{\omega_{slip}}), \quad (21)$$

$$K_{Hqd} = -\widehat{\sigma L_s}(\widehat{\omega_r} + \widehat{\omega_{slip}})$$

The effective plant transfer function $P_{eff}(s)$ is set forth in equation (22):

$$P_{eff}(s) = \begin{bmatrix} \frac{1}{(\sigma L_s)s + r_\sigma} & 0 \\ 0 & \frac{1}{(\sigma L_s)s + r_\sigma} \end{bmatrix} \quad (22)$$

To obtain a first order closed loop response, the closed-loop transfer matrix G(s) of the system may take a form set forth in equation (23):

$$G(s) = \begin{bmatrix} \frac{\omega_d}{s + \omega_d} & 0 \\ 0 & \frac{\omega_d}{s + \omega_d} \end{bmatrix} \quad (23)$$

To obtain the desired response, terms of the forward path transfer function C(s) are chosen as set forth in equations (24)-(25):

$$K_{pdd} = K_{pqq} = \widehat{\sigma L_s}\omega_d, \quad (24)$$

$$K_{Idd} = K_{Iqq} = \widehat{r_\sigma}\omega_d \quad$$

$$K_{Pdq} = K_{Pqd} = K_{Idq} = K_{Iqd} = 0 \quad (25)$$

The open loop transfer function of a control system implementing the DDC technique is set forth in equation (26):

$$C(s)P_{eff}(s) = \begin{bmatrix} \frac{\left(\sigma L_s\omega_d + \frac{r_\sigma\omega_d}{s}\right)}{(\sigma L_s)s + r_\sigma} & 0 \\ 0 & \frac{\left(\sigma L_s\omega_d + \frac{r_\sigma\omega_d}{s}\right)}{(\sigma L_s)s + r_\sigma} \end{bmatrix} \quad (26)$$

The tunable parameter for a DDC control system is $\omega_d$. Effectiveness of the DDC control method may depend on accurate estimation of the motor parameters and accuracy of the sensors.

Enhanced Feedback Decoupling Control (EFDC)

The DDC control technique may be sensitive to resistance variation. To overcome this sensitivity, the present disclosure provides an Enhanced Feedback Decoupling Control (EFDC) control technique, in which the main-diagonal gains of the feedback controller are set as set forth in equations (27)-(28):

$$K_{Hdd} = K_{Hqq} = -r' \quad (27)$$

$$K_{Hdq} = \widehat{\sigma L_s}(\widehat{\omega_r} + \widehat{\omega_{slip}}), \quad (28)$$

$$K_{Hqd} = -\widehat{\sigma L_s}(\widehat{\omega_r} + \widehat{\omega_{slip}})$$

where r' is a virtual resistance, which may be a function of a total winding resistance of the IM 102.

This results in an increased resistance of the motor as seen by the controller. A large value of r' will reduce the sensitivity of the controller to motor parameter variation. Like DDC, the diagonal gains of the feedback controller are as set forth in equation (21), above.

The effective plant transfer function $P_{eff}(s)$ is set forth in equation (29):

$$P_{eff}(s) = \begin{bmatrix} \frac{1}{(\sigma L_s)s + (r_\sigma + r')} & 0 \\ 0 & \frac{1}{(\sigma L_s)s + (r_\sigma + r')} \end{bmatrix} \quad (29)$$

It can be shown that, for obtaining a first order closed-loop response, the forward-path controller gains may be as set forth in equations (30)-(31):

$$K_{pdd} = K_{pqq} = \widehat{\sigma L_s}\omega_d, \quad (30)$$

$$K_{Idd} = K_{Iqq} = (\widehat{r_\sigma} + r')\omega_d$$

$$K_{Pdq} = K_{Pqd} = K_{Idq} = K_{Iqd} = 0 \quad (31)$$

The open loop transfer function of a control system implementing the EFDC technique is set forth in equation (32):

$$C(s)P_{eff}(s) = \begin{bmatrix} \frac{\left(\sigma L_s\omega_d + \frac{(r_\sigma + r')\omega_d}{s}\right)}{(\sigma L_s)s + (r_\sigma + r')} & 0 \\ 0 & \frac{\left(\sigma L_s\omega_d + \frac{(r_\sigma + r')\omega_d}{s}\right)}{(\sigma L_s)s + (r_\sigma + r')} \end{bmatrix} \quad (32)$$

The closed loop transfer function of the control system implementing the EFDC technique is set forth in equation (33):

$$G(s) = \begin{bmatrix} \dfrac{\omega_d}{s + \omega_d} & 0 \\ 0 & \dfrac{\omega_d}{s + \omega_d} \end{bmatrix} \quad (33)$$

Active Damping Decoupling Control (ADDC)

The present disclosure also provides an Active Damping Decoupling Control (ADDC) control technique, in which the forward path controller is designed such that the diagonal components of open loop transfer matrix are second order. All the proportional gains in the forward-path compensator are set to zero. Thus, pole-zero cancellation is avoided in the open-loop transfer matrix and therefore, a second order closed loop response is achieved. The terms of the feedback path transfer function H(s) are as set forth in equation (34):

$$H(s) = \begin{bmatrix} -r' & -\omega_s \sigma L_s \\ \omega_s \sigma L_s & -r' \end{bmatrix} \quad (34)$$

The terms of the forward path transfer function C(s) are chosen as are as set forth in equation (35):

$$C(s) = \begin{bmatrix} \dfrac{K_{Idd}}{s} & 0 \\ 0 & \dfrac{K_{Iqq}}{s} \end{bmatrix} \quad (35)$$

The open loop transfer function of a control system implementing the ADDC technique is set forth in equation (36):

$$C(s)P_{eff}(s) = \begin{bmatrix} \dfrac{(\omega_n^2)}{s\left(s + \left(\dfrac{r_\sigma + r'}{\sigma Ls}\right)\omega_n\right)} & 0 \\ 0 & \dfrac{(\omega_n^2)}{s\left(s + \left(\dfrac{r_\sigma + r'}{\sigma Ls}\right)\omega_n\right)} \end{bmatrix} \quad (36)$$

The closed loop transfer function of the control system implementing the ADDC technique is set forth in equation (37):

$$G(s) = \begin{bmatrix} \dfrac{K_{Idd}}{(\sigma L_s)s^2 + (r_\sigma + r')s + K_{Idd}} & 0 \\ 0 & \dfrac{K_{Iqq}}{(\sigma L_s)s^2 + (r_\sigma + r')s + K_{Iqq}} \end{bmatrix} \quad (37)$$

The desired response of the control system implementing the ADDC technique is set has a form:

$$\begin{bmatrix} \dfrac{\omega_n^2}{s^2 + 2\zeta\omega_n s + \omega_n^2} & 0 \\ 0 & \dfrac{\omega_n^2}{s^2 + 2\zeta\omega_n s + \omega_n^2} \end{bmatrix}$$

where $\omega_n$ is the natural frequency, and $\zeta$ is the damping coefficient.

By comparing terms, the forward path controller gains may be as set forth in equations (38)-(39):

$$K_{Idd} = K_{Iqq} = \sigma L_s \omega_n^2, \; K_{Pdd} = K_{Pqq} = 0 \quad (38)$$

$$K_{Pdq} = K_{Pqd} = K_{Idq} = K_{Iqd} = 0 \quad (39)$$

So, the integral gain is dependent on inductance and the natural frequency of the IM 102. Also, the additional resistance value is determined by the choice of the natural frequency and damping coefficient.

The Effect of Slip Speed and Rotor Flux Estimation

Error in the estimation of the rotor flux and synchronous speed may cause the appearance of the cross-coupling terms and voltage disturbance at the input of the plant model. The d-axis rotor flux dynamics is described as set forth in equation (40):

$$\lambda_{dr} = \dfrac{L_m}{(1 + \tau_r s)} i_{ds} \quad (40)$$

The present disclosure provides for the three control methods to be implemented with and without considering rotor flux dynamics. Without considering rotor flux dynamics, the rotor flux may be estimated as set forth in equation (41):

$$\psi_{rd} = L_m i_{sd} \quad (41)$$

The slip speed $\omega_{slip}$ can be estimated using both d- and q-axis current commands and measured currents, as set forth in equations (42)-(43):

$$\omega_{slip} = \omega_s - \omega_r = \dfrac{L_m}{\tau_r} \dfrac{i_{qs}}{\lambda_{dr}} \quad (42)$$

$$\omega_{slip} = \left(\dfrac{1}{\tau_r} \dfrac{i_{sq}}{i_{sd}}\right)(1 + \tau_r s) \quad (43)$$

where s represents the derivative operator, which will be discretized in a microprocessor or microcontroller-based implementation.

Figures 6, 7:
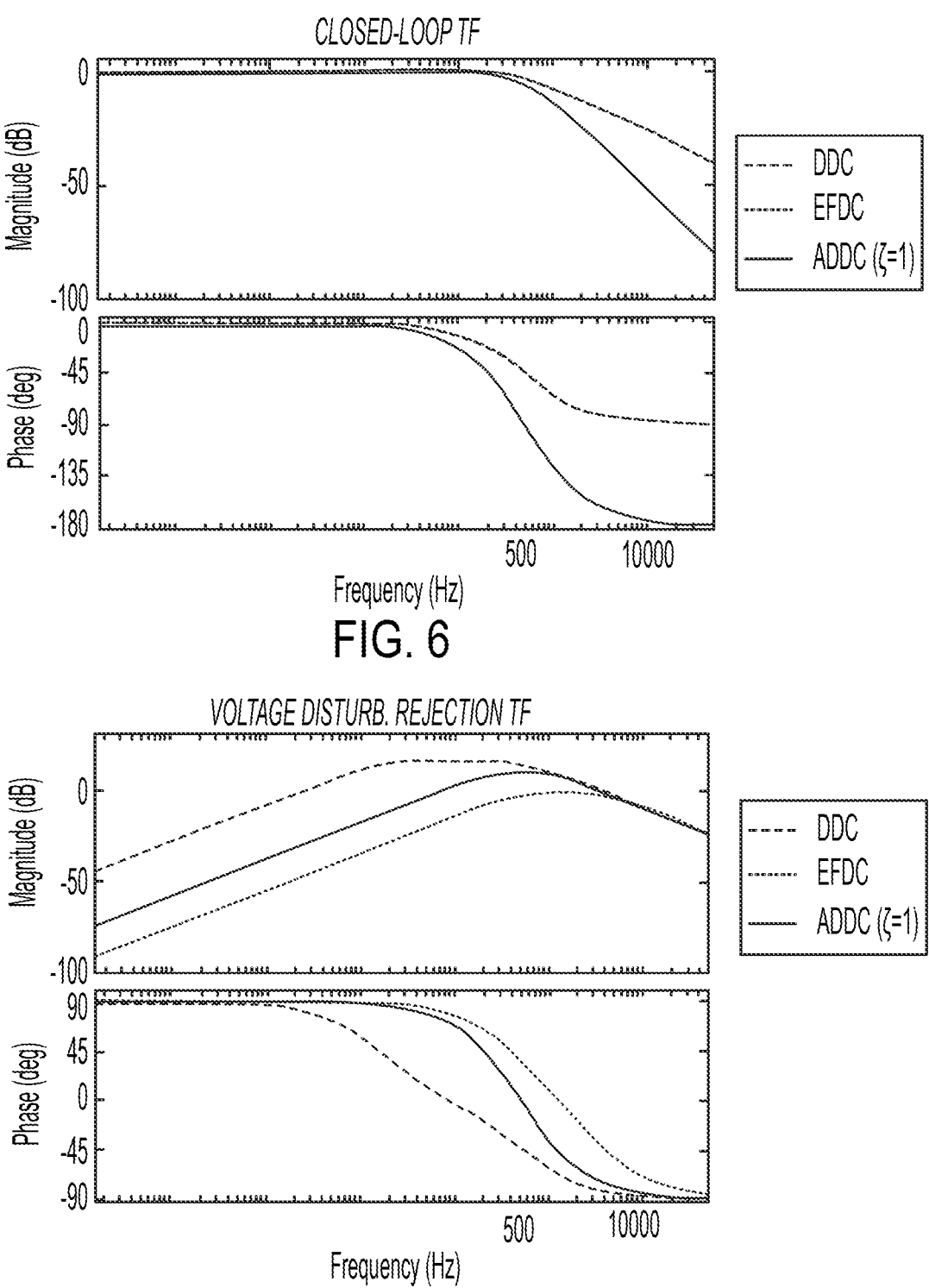
FIG. 6 shows graphs with plots of magnitude and phase, as a function of frequency, for a closed-loop transfer function (TF), according to aspects of the present disclosure.
FIG. 7 shows graphs with plots of magnitude and phase, as a function of frequency, for a voltage disturbance rejection TF, according to aspects of the present disclosure.
Figures 8, 9:
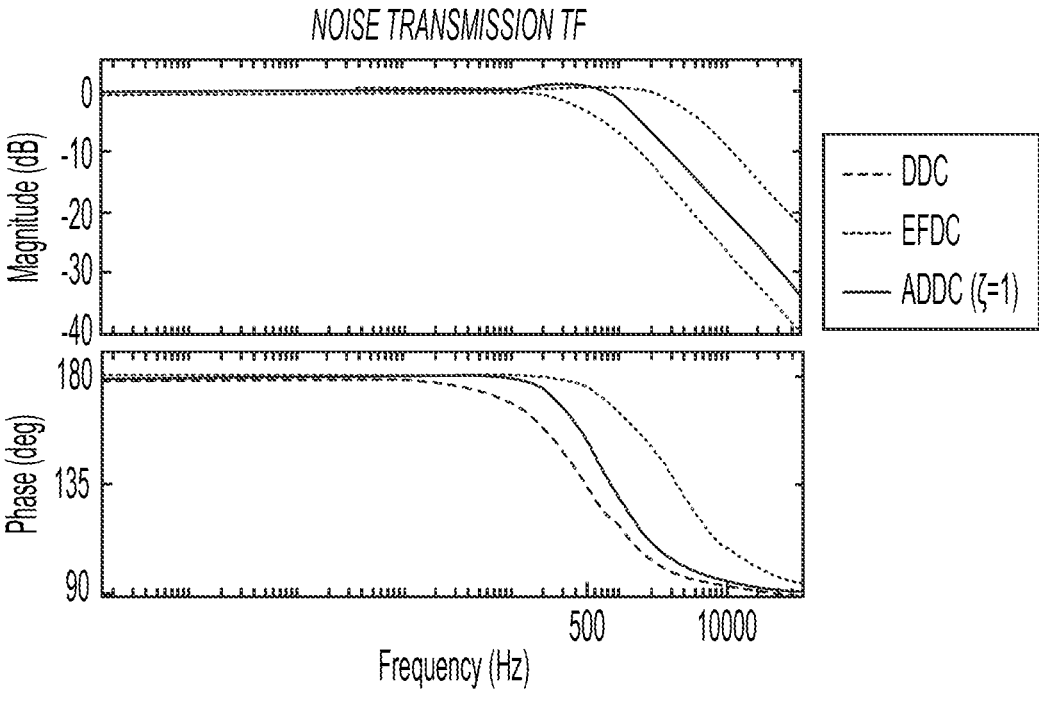
FIG. 8 shows graphs with plots of magnitude and phase, as a function of frequency, for a noise transmission TF, according to aspects of the present disclosure.
FIG. 9 shows graphs with plots of magnitude and phase, as a function of frequency, for a current disturbance rejection TF, according to aspects of the present disclosure.

FIGS. 6-9 show graphs illustrating performance of the provided DDC, EFDC and ADDC control techniques (with damping coefficient $\zeta=1$). FIG. 6 shows graphs with plots of magnitude and phase, as a function of frequency, for a closed-loop transfer function (TF). FIG. 7 shows graphs with plots of magnitude and phase, as a function of frequency, for a voltage disturbance rejection TF. FIG. 8 shows graphs with plots of magnitude and phase, as a function of frequency, for a noise transmission TF, according to aspects of the present disclosure.

Figure 10:
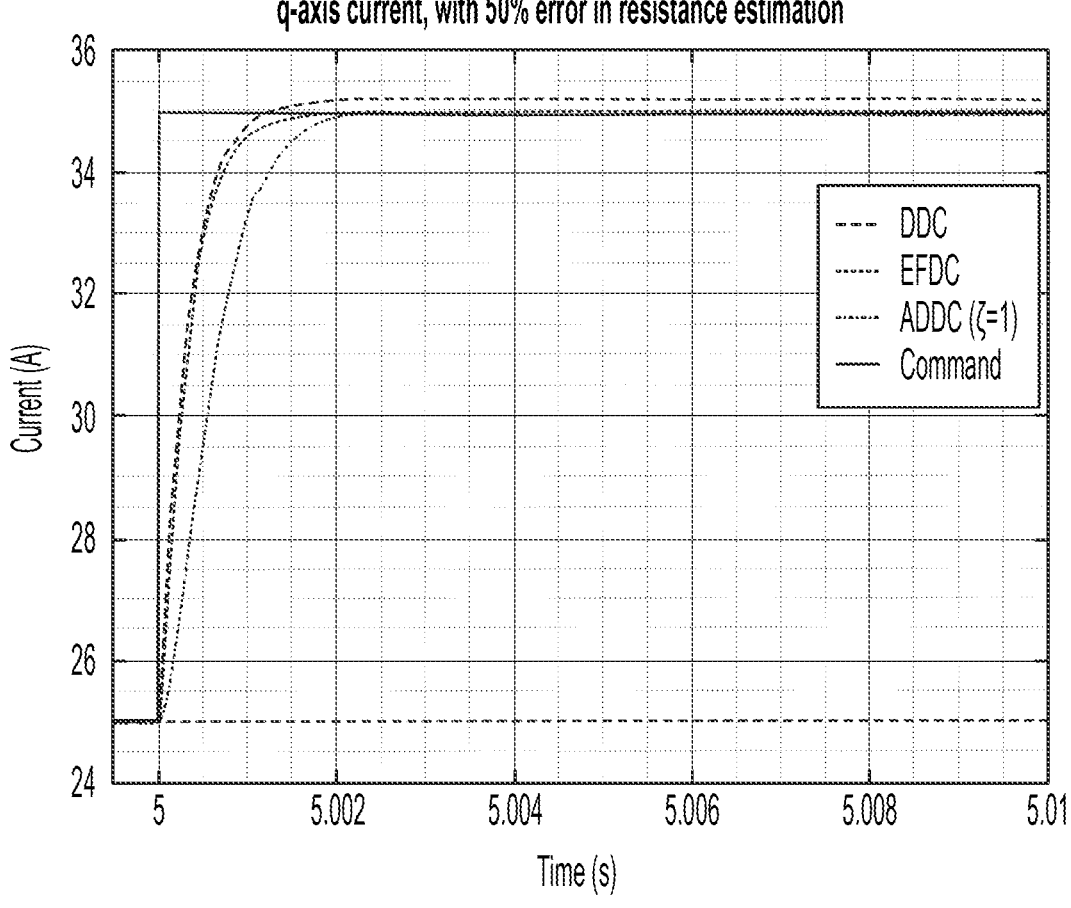
FIG. 10 shows a step response graph of q-axis current, with 50% error in resistance estimation, according to aspects of the present disclosure.
Figure 11:
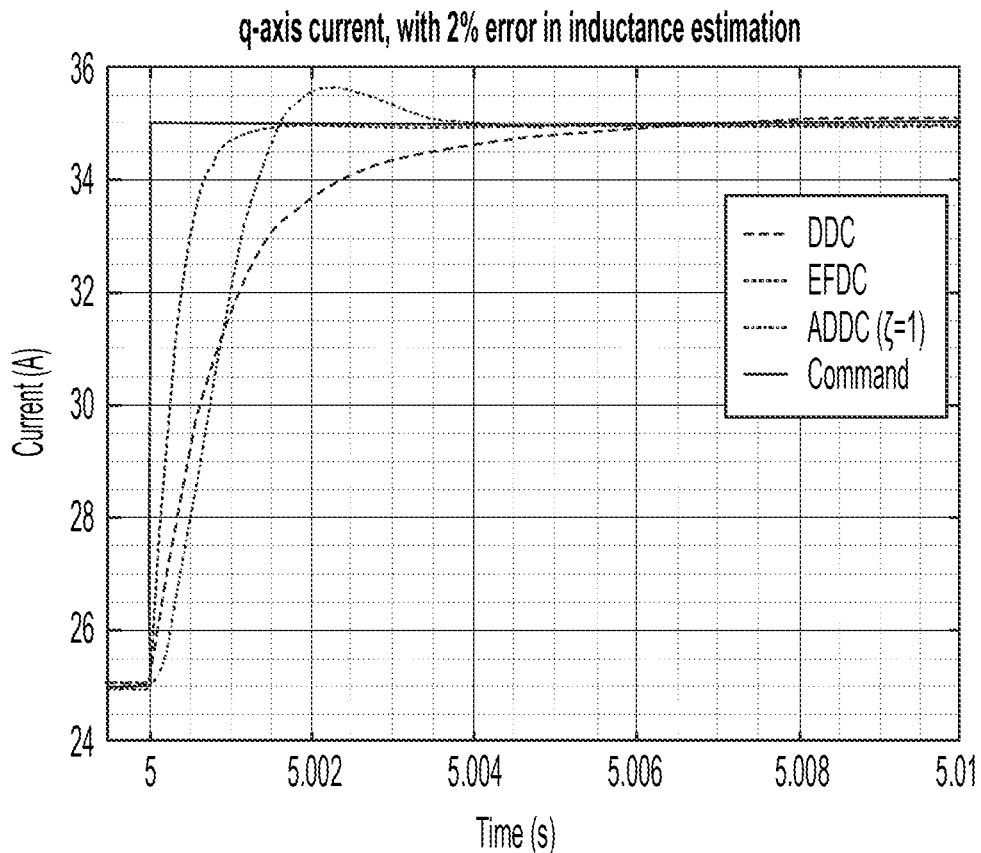
FIG. 11 shows a step response graph of q-axis current, with 2% error in resistance estimation, according to aspects of the present disclosure.

FIG. 10 shows a step response graph of q-axis current for a controller implementing the provided DDC, EFDC and ADDC control techniques with 50% error in resistance estimation, and FIG. 11 shows a similar step response graph of q-axis current, with 2% error in resistance estimation.

FIG. 12 is a flow diagram generally illustrating a method 300 for controlling an induction machine, according to the principles of the present disclosure.

At 302, the method 300 determines a forward path voltage signal based on a command current and using a first set of gain factors. For example, the processor 152 may execute instructions to implement the feedback current controller 230, including the proportional compensation module 204 and the integral compensation module 210 to generate the command voltage $V_C$, which may also be called a forward path voltage signal, based on the reference current $I_R$, which may also be called the command current i*, As described, each of the proportional compensation module 204 and the integral compensation module 210 include a corresponding set of gain factors.

At 304, the method 300 determines an estimated slip speed of the induction machine. For example, the processor 152 may execute instructions to implement the slip-speed estimator 218 and/or to calculate the estimated slip speed $\widehat{\omega_{slip}}$ as set forth in equations (42)-(43).

At 306, the method 300 determines a feedback path voltage signal based on a measured motor current and using a second set of gain factors, wherein at least one gain factor of the second set of gain factors includes the estimated slip speed of the induction machine. For example, the processor 152 may execute instructions to implement the modification module 216 to generate the modification voltage $V_H$, which may also be called a feedback path voltage signal, based on the measured current $I_M$, and using a second set of gain factors, such as the terms of the matrix $$\begin{bmatrix} K_{Hdd} & K_{Hdq} \\ K_{Hqd} & K_{Hqq} \end{bmatrix}$$

shown and described with reference to FIG. 5.

At 308, the method 300 determines a final voltage command based on both of the forward path voltage signal and the feedback path voltage signal. For example, the processor 152 may execute instructions to implement the second adder 212 to compute the reference voltage $V_R$ as a sum of the command voltage $V_C$, and the modification voltage $V_H$.

At 310, the method 300 commands, based on the reference voltage signal, an inverter to apply an output voltage to the induction machine, thereby causing an output current to be generated in a stator winding of the induction machine. For example, the processor 152 may execute instructions to command the inverter 104 to produce the output voltage for application to the windings of the IM 102

In some embodiments, the output current has a d-axis component and a q-axis component, and at least one of the first set of gain factors and the second set of gain factors is configured to cause the d-axis component to be decoupled from variations of the q-axis component of the output current, and to cause the q-axis component to be decoupled from variations of the d-axis component of the output current.

The present disclosure provides a method for controlling an induction machine. The method includes: determining a forward path voltage signal based on a command current and using a first set of gain factors; determining an estimated slip speed of the induction machine; determining a feedback path voltage signal based on a measured motor current and using a second set of gain factors, wherein at least one gain factor of the second set of gain factors includes the estimated slip speed of the induction machine; determining a reference voltage signal based on both of the forward path voltage signal and the feedback path voltage signal; and commanding, based on the reference voltage signal, an inverter to apply an output voltage to the induction machine and thereby causing an output current to be generated in a stator winding of the induction machine.

In some embodiments, determining the estimated slip speed of the induction machine includes calculating the estimated slip speed in accordance with an equation:

$$\omega_{slip} = \omega_s - \omega_r = \frac{L_m}{\tau_r} \frac{i_{qs}}{\psi_{rd}},$$

where $\omega_{slip}$ is the slip speed of the induction machine, in radians per second, $\omega_s$ is a stator electrical speed of the induction machine, $\omega_r$ is a rotor speed of the induction machine, $L_m$ is a mutual inductance of the induction machine, $i_{qs}$ is the q-axis component of the output current, $\tau_r$ is a rotor time constant of the induction machine, and $\omega_{rd}$ is a d-axis rotor flux.

In some embodiments, determining the estimated slip speed of the induction machine includes calculating the estimated slip speed in accordance with an equation:

$$\omega_{slip} = \left(\frac{1}{\tau_r} \frac{i_{sq}}{i_{sd}}\right)(1 + \tau_r s),$$

where $\omega_{slip}$ is the slip speed of the induction machine, in radians per second, $\tau_r$ is a rotor time constant of the induction machine, $i_{sq}$ is the q-axis component of the output current, $i_{sd}$ is the d-axis component of the output current, and s represents a derivative operator.

In some embodiments, the output current has a d-axis component and a q-axis component, and at least one of the first set of gain factors and the second set of gain factors is configured to cause the d-axis component to be decoupled from variations of the q-axis component of the output current, and to cause the q-axis component to be decoupled from variations of the d-axis component of the output current.

In some embodiments, the first set of gain factors is configured to cause the d-axis component to be decoupled from variations of the q-axis component of the output current, and to cause the q-axis component to be decoupled from variations of the d-axis component of the output current.

In some embodiments, the second set of gain factors is configured to cause the d-axis component to be decoupled from variations of the q-axis component of the output current, and to cause the q-axis component to be decoupled from variations of the d-axis component of the output current.

In some embodiments, the first set of gain factors and the second set of gain factors, together, cause the output current to be generated with a first-order frequency response.

In some embodiments, determining the feedback path voltage signal based on a measured motor current includes using a transfer matrix:

$$H(s) = \begin{bmatrix} 0 & \widehat{\sigma L_s}(\widehat{\omega_r} + \widehat{\omega_{slip}}) \\ -\widehat{\sigma L_s}(\widehat{\omega_r} + \widehat{\omega_{slip}}) & 0 \end{bmatrix},$$

where $\widehat{\sigma L_s}$ is an estimated leakage inductance, $\widehat{\omega_r}$ is an estimated rotor speed of the induction machine, and $\widehat{\omega_{slip}}$ is an estimated slip speed of the induction machine.

In some embodiments, determining the forward path voltage signal based on the command current includes using a transfer matrix:

$$C(s) = \begin{bmatrix} \left(\widehat{\sigma L_s}\omega_d + \dfrac{\widehat{r_\sigma}\omega_d}{s}\right) & 0 \\ 0 & \left(\widehat{\sigma L_s}\omega_d + \dfrac{(\widehat{r_\sigma} + r')\omega_d}{s}\right) \end{bmatrix},$$

where $\widehat{r_\sigma}$ is an estimated equivalent stator resistance, $\widehat{\sigma L_s}$ is an estimated leakage inductance, $\omega_d$ is a tunable parameter, and s represents a derivative operator.

In some embodiments, determining the feedback path voltage signal based on a measured motor current includes using a transfer matrix:

$$H(s) = \begin{bmatrix} -r' & \widehat{\sigma L_s}(\widehat{\omega_r} + \widehat{\omega_{slip}}) \\ -\widehat{\sigma L_s}(\widehat{\omega_r} + \widehat{\omega_{slip}}) & -r' \end{bmatrix},$$

where r' is a virtual resistance, $\widehat{\sigma L_s}$ is an estimated leakage inductance, $\widehat{\omega_r}$ is an estimated rotor speed of the induction machine, and $\widehat{\omega_{slip}}$ is an estimated slip speed of the induction machine.

In some embodiments, determining the forward path voltage signal based on the command current includes using a transfer matrix:

$$C(s) = \begin{bmatrix} \left(\widehat{\sigma L_s}\omega_d + \dfrac{(\widehat{r_\sigma} + r')\omega_d}{s}\right) & 0 \\ 0 & \left(\widehat{\sigma L_s}\omega_d + \dfrac{(\widehat{r_\sigma} + r')\omega_d}{s}\right) \end{bmatrix},$$

where r' is a virtual resistance, $\widehat{r_\sigma}$ is an estimated equivalent stator resistance, $\widehat{\sigma L_s}$ is an estimated leakage inductance, $\omega_d$ is a tunable parameter, and s represents a operator.

In some embodiments, the first set of gain factors and the second set of gain factors, together, cause the output current to be generated with a second-order frequency response.

In some embodiments, determining the feedback path voltage signal based on a measured motor current includes using a transfer matrix:

$$H(s) = \begin{bmatrix} -r' & \widehat{\sigma L_s}(\widehat{\omega_r} + \widehat{\omega_{slip}}) \\ -\widehat{\sigma L_s}(\widehat{\omega_r} + \widehat{\omega_{slip}}) & -r' \end{bmatrix},$$

where r' is a virtual resistance, $\widehat{\sigma L_s}$ is an estimated leakage inductance of the induction machine, $\widehat{\omega_r}$ is an estimated rotor speed of the induction machine, and $\widehat{\omega_{slip}}$ is an estimated slip speed of the induction machine.

In some embodiments, determining the forward path voltage signal based on the command current includes using a transfer matrix:

$$C(s) = \begin{bmatrix} \left(\dfrac{\widehat{\sigma L_s}\,\omega_d}{s}\right) & 0 \\ 0 & \left(\dfrac{\widehat{\sigma L_s}\,\omega_d}{s}\right) \end{bmatrix},$$

where $\widehat{\sigma L_s}$ is an estimated leakage inductance of the induction machine, $\omega_d$ is a tunable parameter, and s represents a derivative operator.

In some embodiments, the method further includes: determining an estimated rotor flux; and computing a back-EMF (BEMF) compensation voltage based on the estimated rotor flux. In some embodiments, determining the reference voltage signal is further based on the BEMF compensation voltage.

In some embodiments, the estimated rotor flux includes an estimated d-axis rotor flux $\widetilde{\psi_{rd}}$, and the computing the BEMF compensation voltage includes computing the BEMF compensation voltage in accordance with a matrix:

$$\begin{bmatrix} \dfrac{\widehat{k_r}}{\widetilde{\tau_r}}\widetilde{\psi_r} \\ -\widehat{k_r}\omega_e\widetilde{\psi_{rd}} \end{bmatrix},$$

where $\widehat{k_r}$ is an estimated inductance ratio, $\widetilde{\tau_r}$ is an estimated rotor time constant, and $\omega_e$ is a rotor electrical speed.

The present disclosure provides a system for controlling an induction machine. The system includes: a processor and a memory. The memory includes instructions that, when executed by the processor, cause the processor to: determine a forward path voltage signal based on a command current and using a first set of gain factors; determine an estimated slip speed of the induction machine; determine a feedback path voltage signal based on a measured motor current and using a second set of gain factors, wherein at least one gain factor of the second set of gain factors includes the estimated slip speed of the induction machine; determine a reference voltage signal based on both of the forward path voltage signal and the feedback path voltage signal; and command, based on the reference voltage signal, an inverter to apply an output voltage to the induction machine and thereby causing an output current to be generated in a stator winding of the induction machine.

In some embodiments, the output current has a d-axis component and a q-axis component, and at least one of the first set of gain factors and the second set of gain factors is configured to cause the d-axis component to be decoupled from variations of the q-axis component of the output current, and to cause the q-axis component to be decoupled from variations of the d-axis component of the output current.

In some embodiments, determining the estimated slip speed of the induction machine includes calculating the estimated slip speed in accordance with an equation:

$$\omega_{slip} = \omega_s - \omega_r = \frac{L_m}{\tau_r}\frac{i_{qs}}{\psi_{rd}},$$

where $\omega_{slip}$ is the slip speed of the induction machine, in radians per second, $\omega_s$ is a stator electrical speed of the induction machine, $\omega_r$ is a rotor speed of the induction machine, $L_m$ is a mutual inductance of the induction machine, $i_{qs}$ is the q-axis component of the output current, $\tau_r$ is a rotor time constant of the induction machine, and $\omega_{rd}$ is a d-axis rotor flux.

In some embodiments, determining the estimated slip speed of the induction machine includes calculating the estimated slip speed in accordance with an equation:

$$\omega_{slip} = \left(\frac{1}{\tau_r}\frac{i_{sq}}{i_{sd}}\right)(1 + \tau_r s),$$

where $\omega_{slip}$ is the slip speed of the induction machine, in radians per second, $\tau_r$ is a rotor time constant of the induction machine, $i_{sq}$ is the q-axis component of the output current, $i_{sd}$ is the d-axis component of the output current, and s represents a derivative operator.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling an induction machine, the method comprising:

determining a forward path voltage signal based on a command current and using a first set of gain factors;

determining an estimated slip speed of the induction machine;

determining a feedback path voltage signal based on a measured motor current and using a second set of gain factors, wherein at least one gain factor of the second set of gain factors includes the estimated slip speed of the induction machine;

determining a reference voltage signal based on both of the forward path voltage signal and the feedback path voltage signal; and commanding, based on the reference voltage signal, an inverter to apply an output voltage to the induction machine and thereby causing an output current to be generated in a stator winding of the induction machine.

2. The method of claim 1, wherein determining the estimated slip speed of the induction machine includes calculating the estimated slip speed in accordance with an equation:

$$\omega_{slip} = \omega_s - \omega_r = \frac{L_m}{\tau_r}\frac{i_{qs}}{\psi_{rd}},$$

where $\omega_{slip}$ is the slip speed of the induction machine, in radians per second, $\omega_s$ is a stator electrical speed of the induction machine, $\omega_r$ is a rotor speed of the induction machine, $L_m$ is a mutual inductance of the induction machine, $i_{qs}$ is the q-axis component of the output current, $\tau_r$ is a rotor time constant of the induction machine, and $\psi_{rd}$ is a d-axis rotor flux.

3. The method of claim 1, wherein determining the estimated slip speed of the induction machine includes calculating the estimated slip speed in accordance with an equation:

$$\omega_{slip} = \left(\frac{1}{\tau_r}\frac{i_{sq}}{i_{sd}}\right)(1 + \tau_r s),$$

where $\omega_{slip}$ is the slip speed of the induction machine, in radians per second, $\tau_r$ is a rotor time constant of the induction machine, $i_{sq}$ is the q-axis component of the output current, $i_{sd}$ is the d-axis component of the output current, and s represents a derivative operator.

4. The method of claim 1, wherein the output current has a d-axis component and a q-axis component, and at least one of the first set of gain factors and the second set of gain factors is configured to cause the d-axis component to be decoupled from variations of the q-axis component of the output current, and to cause the q-axis component to be decoupled from variations of the d-axis component of the output current.

5. The method of claim 4, wherein the first set of gain factors is configured to cause the d-axis component to be decoupled from variations of the q-axis component of the output current, and to cause the q-axis component to be decoupled from variations of the d-axis component of the output current.

6. The method of claim 4, wherein the second set of gain factors is configured to cause the d-axis component to be decoupled from variations of the q-axis component of the output current, and to cause the q-axis component to be decoupled from variations of the d-axis component of the output current.

7. The method of claim 1, wherein the first set of gain factors and the second set of gain factors, together, cause the output current to be generated with a first-order frequency response.

8. The method of claim 7, wherein determining the feedback path voltage signal based on a measured motor current includes using a transfer matrix:

$$H(s) = \begin{bmatrix} 0 & \widehat{\sigma L}_s(\widehat{\omega_r} + \widehat{\omega_{slip}}) \\ \widehat{\sigma L}_s(\widehat{\omega_r} + \widehat{\omega_{slip}}) & 0 \end{bmatrix},$$

where $\widehat{\sigma L}_s$ is an estimated leakage inductance, $\widehat{\omega_r}$ is an estimated rotor speed of the induction machine, and $\widehat{\omega_{slip}}$ is an estimated slip speed of the induction machine.

9. The method of claim 7, wherein determining the forward path voltage signal based on the command current includes using a transfer matrix:

$$C(s) = \begin{bmatrix} \left(\widehat{\sigma L}_s \omega_d + \frac{\widehat{r_\sigma}\,\omega_d}{s}\right) & 0 \\ 0 & \left(\widehat{\sigma L}_s \omega_d + \frac{(\widehat{r_\sigma} + r')\omega_d}{s}\right) \end{bmatrix},$$

where $\widehat{r_s}$ is an estimated equivalent stator resistance, $\widehat{\sigma L}_s$ is an estimated leakage inductance, $\omega_d$ is a tunable parameter, and s represents a derivative operator.

10. The method of claim 7, wherein determining the feedback path voltage signal based on a measured motor current includes using a transfer matrix:

$$H(s) = \begin{bmatrix} -r' & \widehat{\sigma L}_s(\widehat{\omega_r} + \widehat{\omega_{slip}}) \\ \widehat{\sigma L}_s(\widehat{\omega_r} + \widehat{\omega_{slip}}) & -r' \end{bmatrix},$$

where r' is a virtual resistance, $\widehat{\sigma L}_s$ is an estimated leakage inductance, $\widehat{\omega_r}$ is an estimated rotor speed of the induction machine, and $\widehat{\omega_{slip}}$ is an estimated slip speed of the induction machine.

11. The method of claim 7, wherein determining the forward path voltage signal based on the command current includes using a transfer matrix:

$$C(s) = \begin{bmatrix} \left(\widehat{\sigma L}_s \omega_d + \frac{(\widehat{r_\sigma} + r')\omega_d}{s}\right) & 0 \\ 0 & \left(\widehat{\sigma L}_s \omega_d + \frac{(\widehat{r_\sigma} + r')\omega_d}{s}\right) \end{bmatrix},$$

where r' is a virtual resistance, $\widehat{r_s}$ is an estimated equivalent stator resistance, $\widehat{\sigma L}_s$ is an estimated leakage inductance, $\omega_d$ is a tunable parameter, and s represents a derivative operator.

12. The method of claim 1, wherein the first set of gain factors and the second set of gain factors, together, cause the output current to be generated with a second-order frequency response.

13. The method of claim 12, wherein determining the feedback path voltage signal based on a measured motor current includes using a transfer matrix:

$$H(s) = \begin{bmatrix} -r' & \widehat{\sigma L}_s(\widehat{\omega_r} + \widehat{\omega_{slip}}) \\ -\widehat{\sigma L}_s(\widehat{\omega_r} + \widehat{\omega_{slip}}) & -r' \end{bmatrix},$$

where r' is a virtual resistance, $\widehat{\sigma L}_s$ is an estimated leakage inductance of the induction machine, $\widehat{\omega_r}$ is an estimated rotor speed of the induction machine, and $\widehat{\omega_{slip}}$ is an estimated slip speed of the induction machine.

14. The method of claim 12, wherein determining the forward path voltage signal based on the command current includes using a transfer matrix:

$$C(s) = \begin{bmatrix} \left(\frac{\widehat{\sigma L}_s \omega_d}{s}\right) & 0 \\ 0 & \left(\frac{\widehat{\sigma L}_s \omega_d}{s}\right) \end{bmatrix},$$

where $\widehat{\sigma L}_s$ is an estimated leakage inductance of the induction machine, $\omega_d$ is a tunable parameter, and s represents a derivative operator.

15. The method of claim 1, further comprising:

determining an estimated rotor flux;

computing a back-EMF (BEMF) compensation voltage based on the estimated rotor flux; and wherein the determining the reference voltage signal is further based on the BEMF compensation voltage.

16. The method of claim 15, wherein the estimated rotor flux includes an estimated d-axis rotor flux $\widehat{\psi_{rd}}$, and wherein the computing the BEMF compensation voltage includes computing the BEMF compensation voltage in accordance with a matrix:

$$\begin{bmatrix} \dfrac{\hat{k}_r}{\hat{\tau}_r}\tilde{\psi}_r \\[2mm] -\hat{k}_r\omega_e\tilde{\psi}_{rd} \end{bmatrix},$$

where $\tilde{k}_r$ is an estimated inductance ratio, $\hat{\tau}_r$ is an estimated rotor time constant, and $\omega_e$ is a rotor electrical speed.

17. A system for controlling an induction machine, the system comprising:

a processor and a memory including instructions that, when executed by the processor, cause the processor to:

determine a forward path voltage signal based on a command current and using a first set of gain factors;

determine an estimated slip speed of the induction machine;

determine a feedback path voltage signal based on a measured motor current and using a second set of gain factors, wherein at least one gain factor of the second set of gain factors includes the estimated slip speed of the induction machine;

determine a reference voltage signal based on both of the forward path voltage signal and the feedback path voltage signal; and command, based on the reference voltage signal, an inverter to apply an output voltage to the induction machine and thereby causing an output current to be generated in a stator winding of the induction machine.

18. The system of claim 17, wherein the output current has a d-axis component and a q-axis component, and at least one of the first set of gain factors and the second set of gain factors is configured to cause the d-axis component to be decoupled from variations of the q-axis component of the output current, and to cause the q-axis component to be decoupled from variations of the d-axis component of the output current.

19. The system of claim 17, wherein determining the estimated slip speed of the induction machine includes calculating the estimated slip speed in accordance with an equation:

$$\omega_{slip} = \omega_s - \omega_r = \frac{L_m}{\tau_r}\frac{i_{qs}}{\psi_{rd}},$$

where $\omega_{slip}$ is the slip speed of the induction machine, in radians per second, $\omega_g$ is a stator electrical speed of the induction machine, $\omega_r$ is a rotor speed of the induction machine, $L_m$ is a mutual inductance of the induction machine, $i_{qs}$ is the q-axis component of the output current, tr is a rotor time constant of the induction machine, and $\psi_{rd}$ is a d-axis rotor flux.

20. The system of claim 17, wherein determining the estimated slip speed of the induction machine includes calculating the estimated slip speed in accordance with an equation:

$$\omega_{slip} = \left(\frac{1}{\tau_r}\frac{i_{sq}}{i_{sd}}\right)(1 + \tau_r s),$$

where $\omega_{slip}$ is the slip speed of the induction machine, in radians per second, $\tau_r$ is a rotor time constant of the induction machine, $i_{sq}$ is the q-axis component of the output current, $i_{sd}$ is the d-axis component of the output current, and s represents a derivative operator.

* * * * *